United States Patent
Reid (10) Patent No.: US 7,356,096 B2
(45) Date of Patent: Apr. 8, 2008

(54) MULTIPLE HYPOTHESIS CHANNEL ESTIMATION AND PREDICTION FOR OFDM SYSTEMS

(75) Inventor: Anthony Reid, Plano, TX (US)

(73) Assignee: Nokia Corporation, Espoo (FI)

( * ) Notice: Subject to any disclaimer, the term of this patent is extended or adjusted under 35 U.S.C. 154(b) by 648 days.

(21) Appl. No.: 10/892,836

(22) Filed: Jul. 15, 2004

(65) Prior Publication Data

US 2006/0013340 A1    Jan. 19, 2006

(51) Int. Cl.
*H04L 27/06* (2006.01)
*H04B 1/10* (2006.01)

(52) U.S. Cl. ..................... 375/340; 375/350
(58) Field of Classification Search ............ 375/340, 375/232, 350
See application file for complete search history.

(56) References Cited

U.S. PATENT DOCUMENTS

| | | | |
|---|---|---|---|
| 5,790,412 A * | 8/1998 | Su ........................... | 702/78 |
| 6,570,910 B1 * | 5/2003 | Bottomley et al. ......... | 375/148 |
| 7,061,882 B2 * | 6/2006 | Abrishamkar et al. ...... | 370/320 |
| 7,096,274 B1 * | 8/2006 | Ci et al. ..................... | 709/236 |
| 2006/0047842 A1 * | 3/2006 | McElwain .................. | 709/231 |

OTHER PUBLICATIONS

"Multiple Hypothesis Channel Estimation for the MIMO-OFDM System", Kyeong Jin Kim et al., IEEE Communications Society, 2004, pp. 2674-2678.
"Blind Estimation And Equalization Of Time-Varying Channels Using The Interacting Multiple Model Estimator", Ziauddin M. Kamran, et al., IEEE 2004, pp. V-17-V20.
"IMM-Based Estimation for Slowly Evolving Environments," N.S. Kim, IEEE Signal Processing Letters, vol. 5, No. 6, Jun. 1998.

* cited by examiner

*Primary Examiner*—Don N. Vo
(74) *Attorney, Agent, or Firm*—Harrington & Smith, PC (57) ABSTRACT

A method of modeling channel parameters in Doppler environments estimates both the channel model and the coefficients simultaneously, thus not requiring additional packet overhead. This adaptive technique refines the channel coefficients as the estimate of the model accuracy improves with channel measurements. The underlying models are very accurate representations of Jakes models because they are computed off-line, thus the error prone approaches of trying to estimate one model from the observations are avoided.

30 Claims, 10 Drawing Sheets

- 1st ORDER MODEL $$h(k) = 0.9 * h(k-1) + w(k) \quad (1)$$

- 2nd ORDER MODEL $$h(k) = 0.2 * h(k-1) - 0.1 * h(k-2) + q(k) \quad (2)$$

STATE-SPACE REPRESENTATIONS – 2nd ORDER MODEL $$\begin{bmatrix} h(k+1) \\ h(k) \end{bmatrix} = \begin{bmatrix} 0.2 & -0.1 \\ 1 & 0 \end{bmatrix} \begin{bmatrix} h(k) \\ h(k-1) \end{bmatrix} + \begin{bmatrix} 1 \\ 0 \end{bmatrix} q(k); \quad \underline{x}(k) = \begin{bmatrix} h(k) \\ h(k-1) \end{bmatrix}; \quad F = \begin{bmatrix} 0.2 & -0.1 \\ 1 & 0 \end{bmatrix}; \quad \Gamma = \begin{bmatrix} 1 \\ 0 \end{bmatrix} \quad (3)$$

$$z(k) = [1 \ 0] \begin{bmatrix} h(k) \\ h(k-1) \end{bmatrix} + n(k); \quad G = [1 \ 0]; \quad \underline{Z} = [z_1 \ z_2 \ldots, z_N] \quad (4)$$

$$x = E(x|\underline{Z}) = \int x p(x|\underline{Z}) dx$$

$$\hat{x} = \sum_{i=1}^{M} \int x p(x, F_i|\underline{Z}) dx = \sum_{i=1}^{M} \int x p(x|\underline{Z}) dx \delta(F - F_i)$$

$$\hat{x} = \sum_{i=1}^{M} p(F_i|\underline{Z}) \underbrace{\int x p(x_i|F_i, \underline{Z}) dx}_{E(x|F_i, \underline{Z})} = \sum_{i=1}^{M} \mu_i E(x|F_i, \underline{Z}) \quad (5)$$

MODEL PROBABILITIES

| FIG.3a |
|--------|
| FIG.3b |

FIG.3

FIG.3a $$\mu_j(k) = P(F_j(k)|z_k, \underline{Z}_{k-1}); \quad \underline{Z}_{k-1} = [z_1, z_2, \ldots, z_{k-1}]$$

$$= \frac{1}{c} P(z_k | F_j(k), \underline{Z}_{k-1}) P(F_j(k) | \underline{Z}_{k-1})$$

$$= \frac{1}{c} \lambda_j(k) \sum_{i=1}^{M} P\{F_j(k)|F_i(k-1), \underline{Z}_{k-1}\} P\{F_i(k-1)|\underline{Z}_{k-1}\}$$

$$= \frac{1}{c} \lambda_j(k) \sum_{i=1}^{M} p_{i,j} \mu_i(k-1) \qquad (6)$$

$$\lambda_j(k) = p(z_k | F_j(k), \underline{Z}_{k-1}) = \frac{1}{\sqrt{2\pi S_j(k)}} \exp\left\{\frac{(z_k - G_j \hat{x}_i(k|k-1))^2}{2S_j(k)}\right\} \qquad (7)$$

$$\hat{x}(k|k) = \sum_{i=1}^{M} \mu_i(k) \hat{x}_i(k|k) \qquad (8)$$

$$P(k|k) = \sum_{i=1}^{M} \mu_i(k) \{P_i(k|k) + [\hat{x}_i(k|k) - \hat{x}(k|k)][\hat{x}_i(k|k) - \hat{x}(k|k)]^T\} \qquad (9)$$

MULTIPLE HYPOTHESIS CHANNEL ESTIMATION AND PREDICTION FOR OFDM SYSTEMS

TECHNICAL FIELD

This invention relates to 4G cellular systems, in particular estimating channel parameters in high Doppler environments.

BACKGROUND OF THE INVENTION

When using a mobile telephone in a high-Doppler environment, (e.g. a Japanese bullet trains) in an OFDM system, there are OFDM symbol-to-symbol variations in channel coefficients. Channel estimation is necessary to detect data symbols in fading channels. During each data transmission (e.g. packet) in an OFDM system, there are some number of OFDM symbols that are transmitted. In high data rate, fading, high-Doppler scenarios expected in 4G, each individual symbol requires channel coefficient estimates, otherwise the detection performance is severely degraded to being unacceptable for a typical mobile user.

When estimating the channel characteristics in a fading, high-Doppler environment there are techniques that assume no particular underlying physical model for the channel coefficients. These are non-parametric approaches. There are also approaches that estimate channel coefficients based on underlying channel models that describe the channel in turn based on a set of parameters. These are parametric approaches. When the parametric models are very accurate in describing the underlying physical characteristics of the channel, then excellent results are obtained by exploiting the model.

Currently "Jake's model" (W. C. Jakes, Jr. Microwave Mobile Communications, John Wiley & Sons, pp. 75, 1974) is universally accepted as a way to parameterize the channel for fading. This model also captures the time-varying nature of Doppler channels in cellular environments.

However there are at least two problems that complicate channel estimation and prediction in high-Doppler user scenarios. One problem is the determination of the parameters of the model that are related to mobile speeds, since the model is used for tracking the channel. Predicting the next state of the channel, and thus exploiting the time-varying characteristics of the channel, reduces the channel estimation error. However this must be done accurately before any channel tracking takes place.

The second problem is the determination of a method to track the channel under time-varying conditions. Parametric approaches require the additional step of model estimation in order to exploit this knowledge to provide the expected channel tracking results. Furthermore this additional step usually requires additional overhead in a typical OFDM packet, which then reduces the amount of data-bearing traffic in each packet transmission and thus causes operator revenue loss.

Previous non-parametric approaches use technique such as least-squares to estimate channel coefficients using the OFDM packet header (i.e. pre-amble) and then apply these channel estimates for all OFDM symbols in a packet. The performance of this approach degrades when the channel coefficients change with time in high-Doppler environments.

Other approaches use embedded pilot symbols in each OFDM symbol, thus wasting spectral efficiency. Since no time-varying model is being used to predict the channel there is no reduction in channel coefficient error if that knowledge were available.

There are also non-parametric "blind" channel estimators that don't use data-bearing symbols in each OFDM symbol, but because there is no exploitation of the time-varying characteristics of the channel, there is no reduction in channel estimation error. There are parametric methods that estimate auto regressive (AR) parameters matched to Jakes model but this usually requires additional overhead to estimate the model. The models are error prone due to noisy data being used to estimate the model parameters. There are numerous other parametric methods that pick a particular channel coefficient model and then live with the results when confronted with an unknown channel.

Thus, the art has not yet developed a method of providing up to date channel parameters in a high-Doppler environment without excessive reduction of bandwidth.

SUMMARY OF THE INVENTION

The invention relates to a method of estimating both the channel model and the coefficients simultaneously using Kalman filters, thus not requiring additional packet overhead.

A feature of the invention is the refinement of the channel coefficients as the estimate of the model accuracy improves with channel measurements.

Another feature of the inventions is that the underlying models are very accurate representations of Jakes model's because they are computed off-line, thereby avoiding the error prone approaches of trying to estimate one model from the observations.

The key advantages are (1) no additional training sequences to estimate AR model parameters (2) hypothesized models (i.e. basis functions) are very accurate fits to Jakes model which is an analytical model (3) model definition is done off-line thus noisy measurements are not used. (4) becomes a single model estimator when actual channel coefficients closely match one of the hypothesized models.

BEST MODE OF CARRYING OUT THE INVENTION

As the requirements for maintaining contact with a mobile station become more stringent, it is necessary to deal with situations in which the mobile station is traveling at a relatively high rate of speed. The environment, however, is typically not steady. An automobile traveling along a highway will be changing its direction with respect to the base station often. Classical Kalman filtering, as used in the prior art, can be used to track very accurately when an object has a constant velocity or constant acceleration trajectory. But in a maneuver (e.g. a curving trajectory) neither trajectory model is correct.

The method of the invention is to formulate a set of reasonable target models, construct Kalman filters for each model offline and then form a weighted combination of the estimates of each model to form a final estimate. The models act as "basis" functions that are used to cover a discrete set of possible models.

In the case of the channel estimation problem, Jakes model can be used to define a Doppler spectrum for different mobile speeds (e.g. 3 km/hr, 150 km/hr, 250 km/hr). In order to apply a time-varying estimator (e.g. Kalman filter), a dynamics model in the form of an AR model can be fit to each autocorrelation function for the Doppler spectrum for each hypothesized vehicle speed. These AR models become the "basis" functions that are used to compute channel estimates. The weights used to linearly combine the individual estimates are formed as follows.

Assume a set of channel model hypotheses $F_1, F_2, \ldots, F_M$ that have been formed by fitting M, AR models for M vehicle speeds. For example, the set of models may include travel directly at or directly away from the base station; travel at right angles to the previous directions, and curves of various radius. The foregoing summarize possible steady trajectories on a highway or in a train. It is desired to form an "optimal" estimate of channel coefficients. One criterion is the minimum mean squared error (MMSE) criteria commonly used to derive Kalman filters.

Figure 3A:
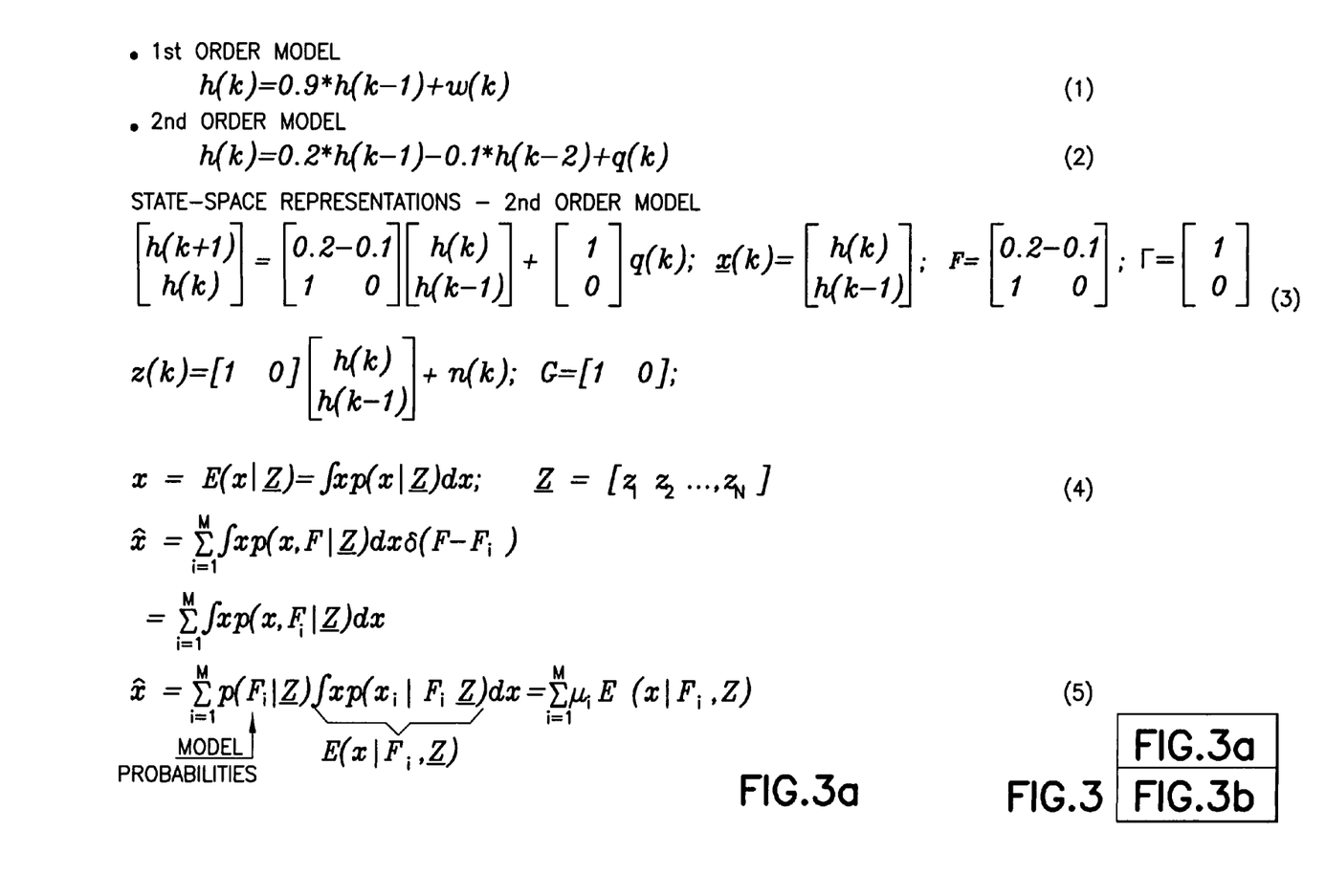
FIG. 3 illustrates equations used to estimate channel parameters.
Figure 3B:
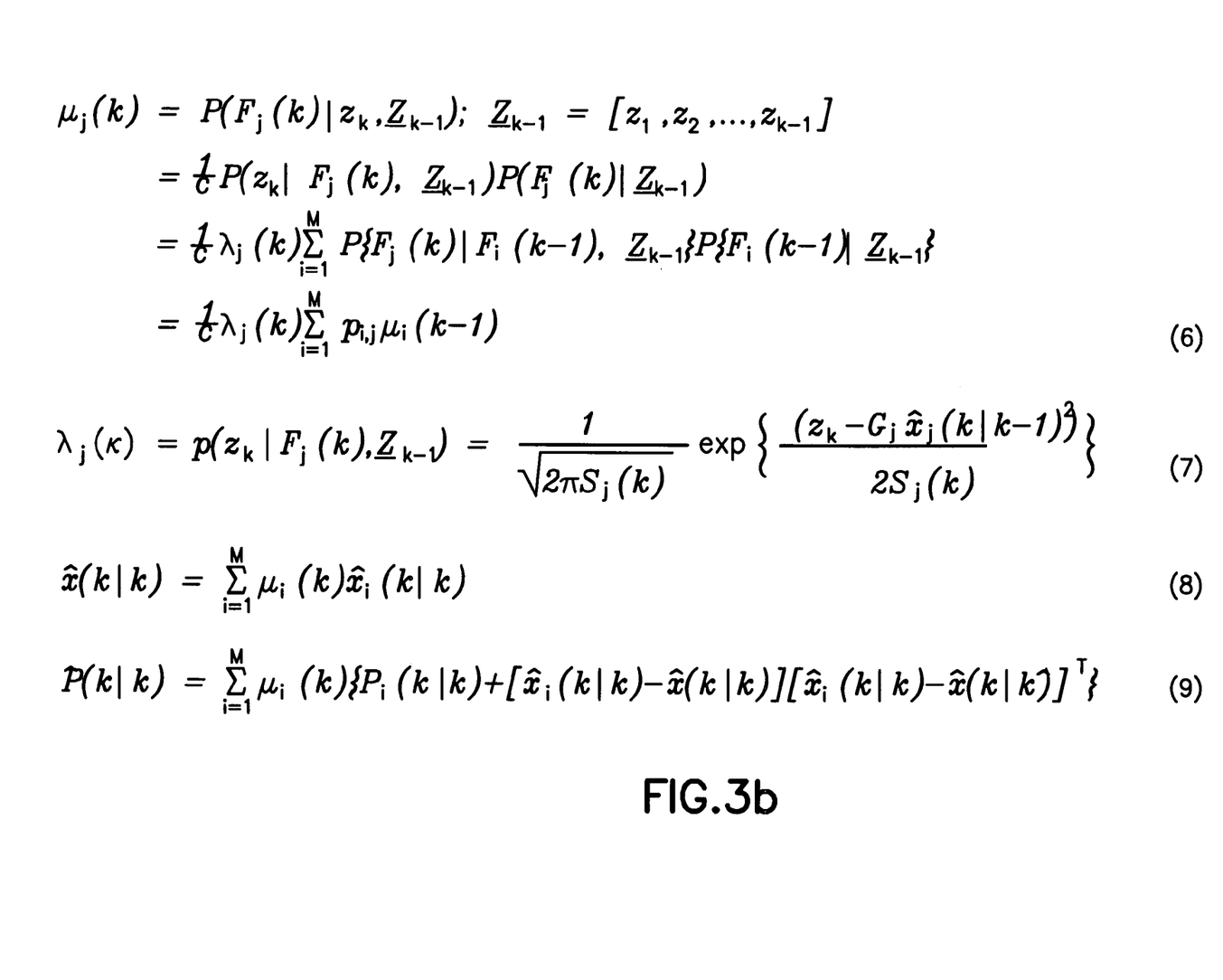
Figure 4A:
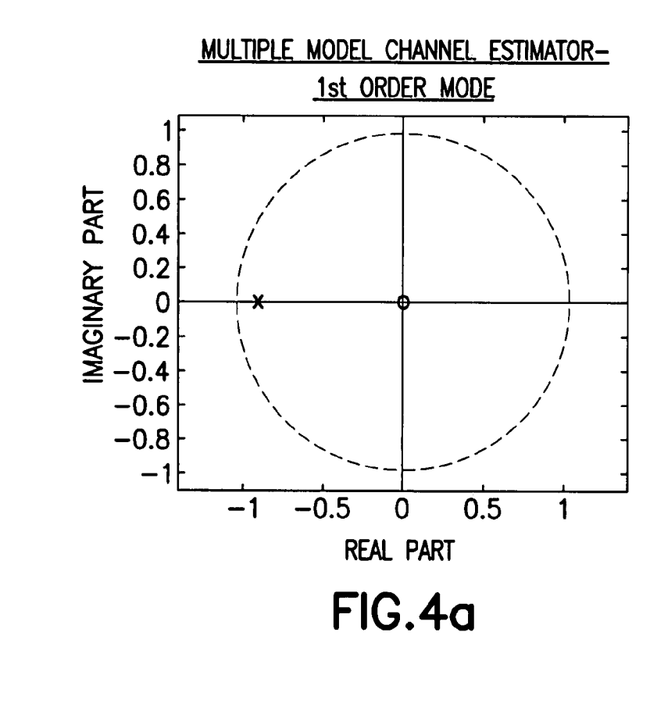
FIG. 4 shows Pole-Zero plots of first and second order models
Figure 4B:
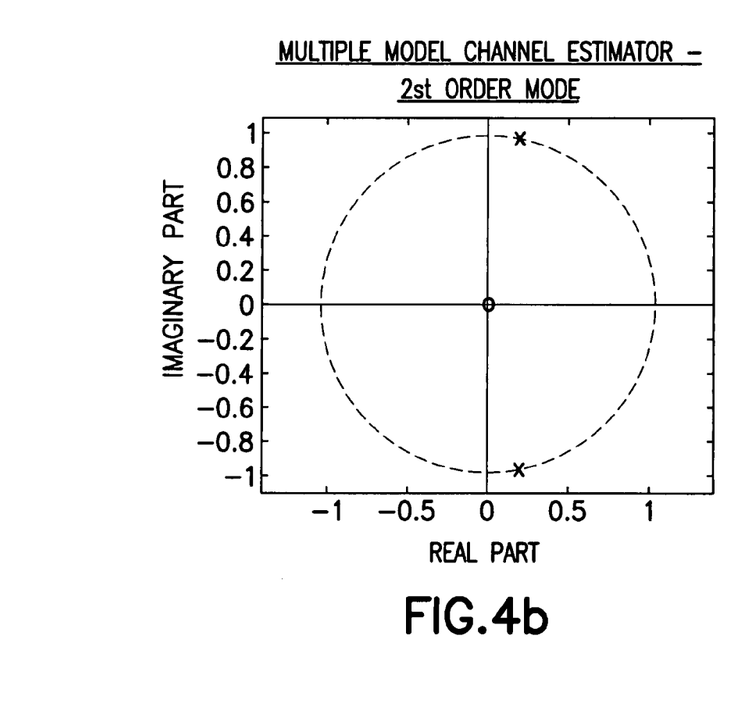
Figure 4C:
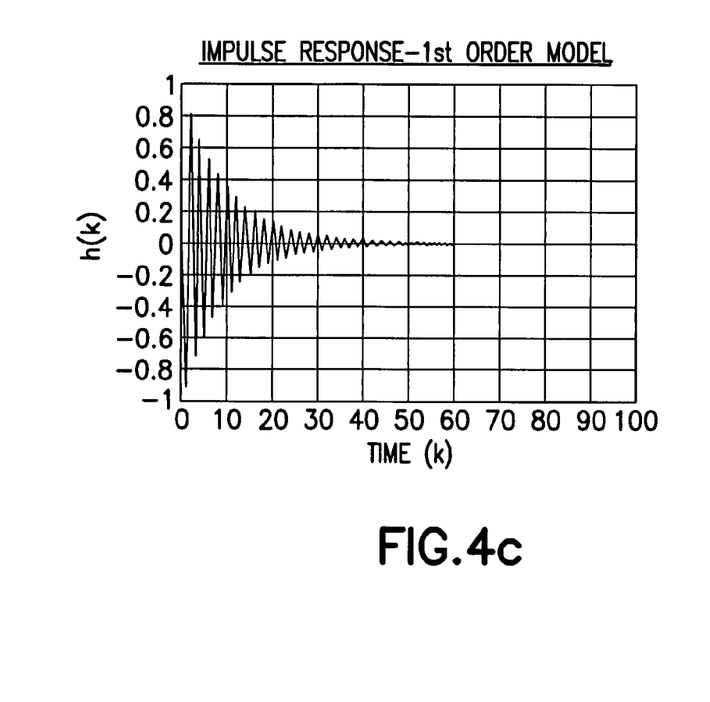
Figure 4D:
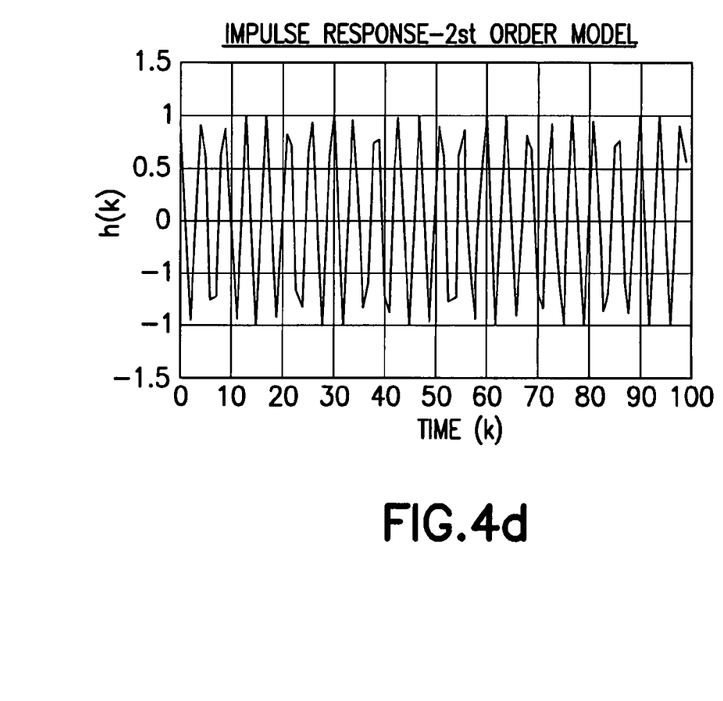

Equation (1) in FIG. 3 shows a first order model of an estimate, in which h(k) is the present channel parameter (the kth time epoch), which depends on the previous time epoch h(k−1) and a residual quantity additive noise term w(k).

Equation (2) shows a second order model, in which h(k) depends on the next two preceding time epochs, (k−1) and (k−2).

Equation (3) shows a more convenient matrix-vector form of the second order model.

FIG. 3 shows the development of the channel estimator. Letting $\hat{x}$ be defined as a vector of channel coefficients, then an optimal estimator has the form shown in Equation 4 of FIG. 3; $\hat{x}=E(x|Z)=\int xp(x|Z)dx$, where Z is a set of channel observations. Using this equation results in a classical Kalman filter. But this holds when the channel model is known. When the channel model is unknown then the same equation is shown but now the channel model hypothesis will be integrated out, treating the channel hypotheses as nuisance parameters. As shown the MMSE estimator has the form $$\hat{x} = \sum_{i=1}^{M} p(F_i \mid Z) E(x \mid Z, F_i),$$

as shown in Equation (5) of FIG. 3.

Now each term $E(x|Z, F_i)$ is implemented as a Kalman filter for a particular channel model. Each term $p(F_i|Z)$ is the weight for the Kalman estimate. These weights depend on the likelihoods of the observations. For example when the actual channel is one of the hypothesized channel models Q then $p(F_Q|Z) \approx 1$ and all other $p(F_i|Z) \approx 0$.

An advantageous feature of the invention is that, in the calculation of estimated channel parameters x, the value is summed over the model hypotheses available. The result is that the model hypotheses are effectively "integrated out"; i.e. the contribution from each model to that particular estimate is added in the calculation of $\mu_i$, as shown in equation (6) of FIG. 3.

The result, as shown in Equation 8 of FIG. 3, is that the current estimated parameter set x is a sum over all the current model hypothesis.

Figure 1:
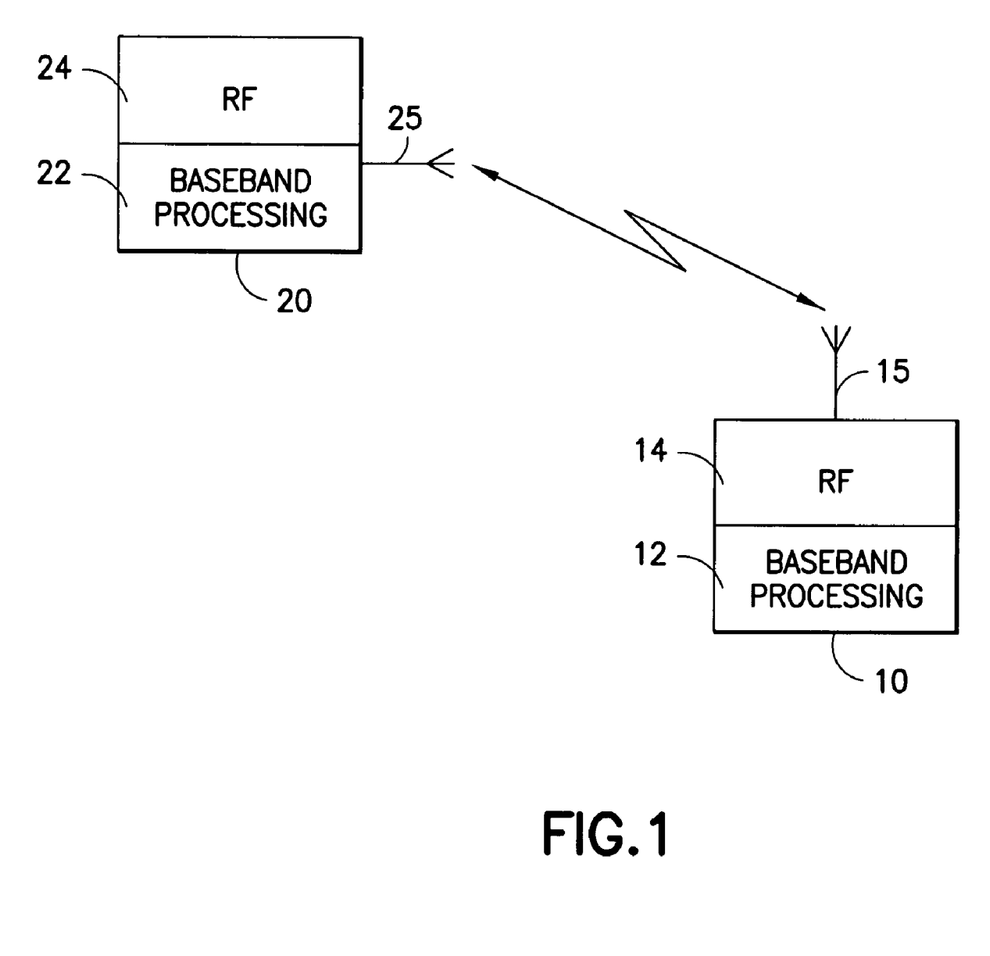
FIG. 1 illustrates a simplified system for use with the invention.
Figure 2:
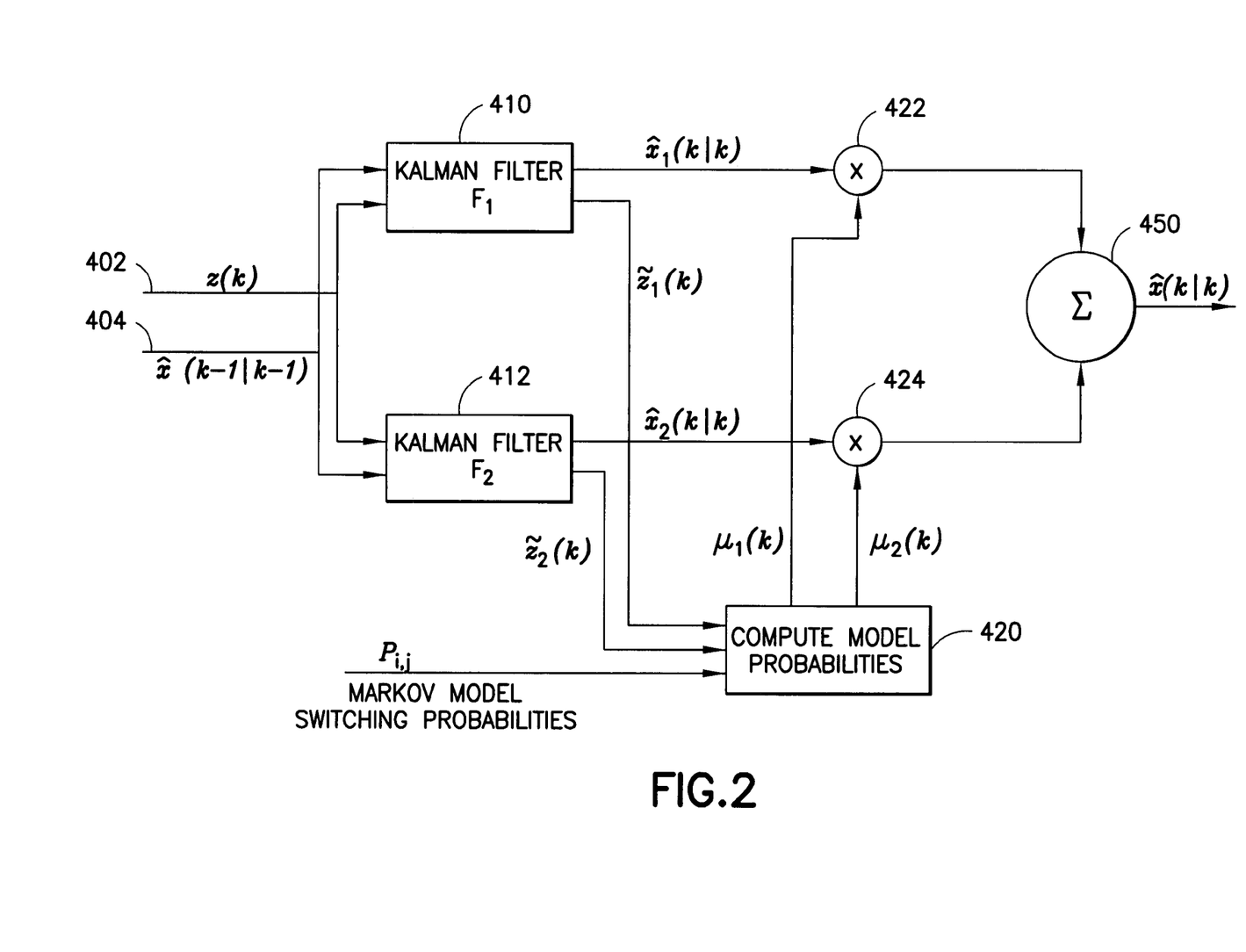
FIG. 2 shows an architecture of a non-linear estimator.

FIG. 2 shows the structure of the estimator for 2 hypothesized channel models $F_1, F_2$. Each Kalman filter for models $F_1, F_2$ receives the observations and the channel estimates for the previous time epoch z(k), $\hat{x}(k-1|k-1)$ respectively. A new channel estimate is computed for each Kalman filter $\hat{x}_1(k|k), \hat{x}_2(k|k)$ The weight terms now denoted as $\mu_1(k), \mu_2(k)$ for the model probabilities depend on the residual error terms $\tilde{z}_1(k), \tilde{z}_2(k)$. These residuals represent the estimation error between the channel measurements and the estimates. When the residuals are small then the model probabilities are nearly "one". When the errors are large then the model probabilities are near "zero". Each Kalman filter would implement a particular channel model. For example, a 3 km/hr. Doppler channel would be modelled as a first order AR(1) model. While a 50 km/hr. mobile might be modelled as a second order AR(2) model.

On the left of FIG. 2, inputs z(k) on line 402 represent the channel observations on the current kth OFDM symbol, while inputs x on line 404 represent channel estimates on the previous (k−1)th packet. Both inputs go to Kalman filters 410 and 412 that have previously been set up to represent two channel models $F_1$ and $F_2$, respectively.

The output from the Kalman filter 410 is an updated channel estimate $\hat{x}_1(k)$ and an estimated residual $\tilde{z}_1(k)$ in the context of the model $F_1$. Similarly, filter 412 generates a corresponding residual $\tilde{z}_2(k)$ and updated channel estimate $\hat{x}_2(k)$.

Both data parameters are input to computer 420, which computes the probabilities $\mu_1(k)$ and $\mu_2(k)$ of the respective data being correct.

Multipliers 422 and 424 form the product of the data and the probability for each model. Lastly, adder 450 sums the inputs from units 422 and 424 to generate a final channel estimate $\hat{x}(k)$.

Simulations have been performed for examples of first and second order AR models in the context of 4G OFDM parameters (e.g. time duration (T) of OFDM symbol of 22 μsec and (22-25) OFDM symbols per packet.

For pedestrian use, an AR(1) model is satisfactory. For ground based travel, (up to 250 km/hr) an AR(2) model was found to be satisfactory. When one of the model hypotheses was correct, the estimated parameters converged to the values of the correct model within less than 10 time epochs.

Estimations in methods according to the invention may be performed "blind" i.e. without any training sequences. Alternatively, every Nth OFDM symbol may be dedicated to training sequences, with consequent loss of data capacity. As another option, a pilot tone may be added to the transmitted data for each OFDM symbol in a packet. Those skilled in the art will be able to set up these and other alternatives to suit the parameters of a particular configuration.

Table 1 shows a simple computational complexity analysis of this approach in terms of the number of channel model hypotheses (N). This approach is often called a "Generalized Pseudo-Bayesian 1" (GPB1). GPB2 and Interacting Mixture Model (IMM) are alternative approaches that compute the terms $\mu_1(k), \mu_2(k)$ in a different way.

TABLE 1

Computational Complexity

|  | GPB1 | GPB2 | IMM |
|---|---|---|---|
| Number of Kalman filters | N | $N^2$ | N |
| Number of combinations of N estimates and covariance | 1 | N + 1 | N + 1 |
| Number of $\mu_i(k)$ | N | $N^2 + N$ | $N^2 + 1$ |

The GPB2 model handles the possibility of switching models, at the cost of increased computational complexity. The IMM model (N. S. Kim, "IMM-Based Estimation for Slowly Evolving Environments," IEEE Signal Processing Letters, vol. 5, No. 6, June 1998) also permits switching models and has the same order of complexity in terms of the number of parallel Kalman filters.

Those skilled in the art will readily be able, in the light of this disclosure, to set up different sets of models for the channel—e.g. a first set for pedestrian users, a second set for automotive users, a third set for users on high speed vehicles, all of the foregoing having a set of directions (directly toward and away from the base station, at a right angle to the vector between the base station and the mobile station, at a 45 degree angle, etc. and criteria for switching from one set to another when the user changes traveling mode.

FIGS. 4-6 show an example of the channel estimation for these two channel models. FIG. 4 shows first (FIG. 4A) and second (FIG. 4C) order AR models constructed by defining model coefficients that place "poles" near the unit circle in the pole-zero plots. FIGS. 4B and 4D show the impulse response for each model. The first order model decays rapidly, while the second order model maintains a substantial envelope.

Figure 5:
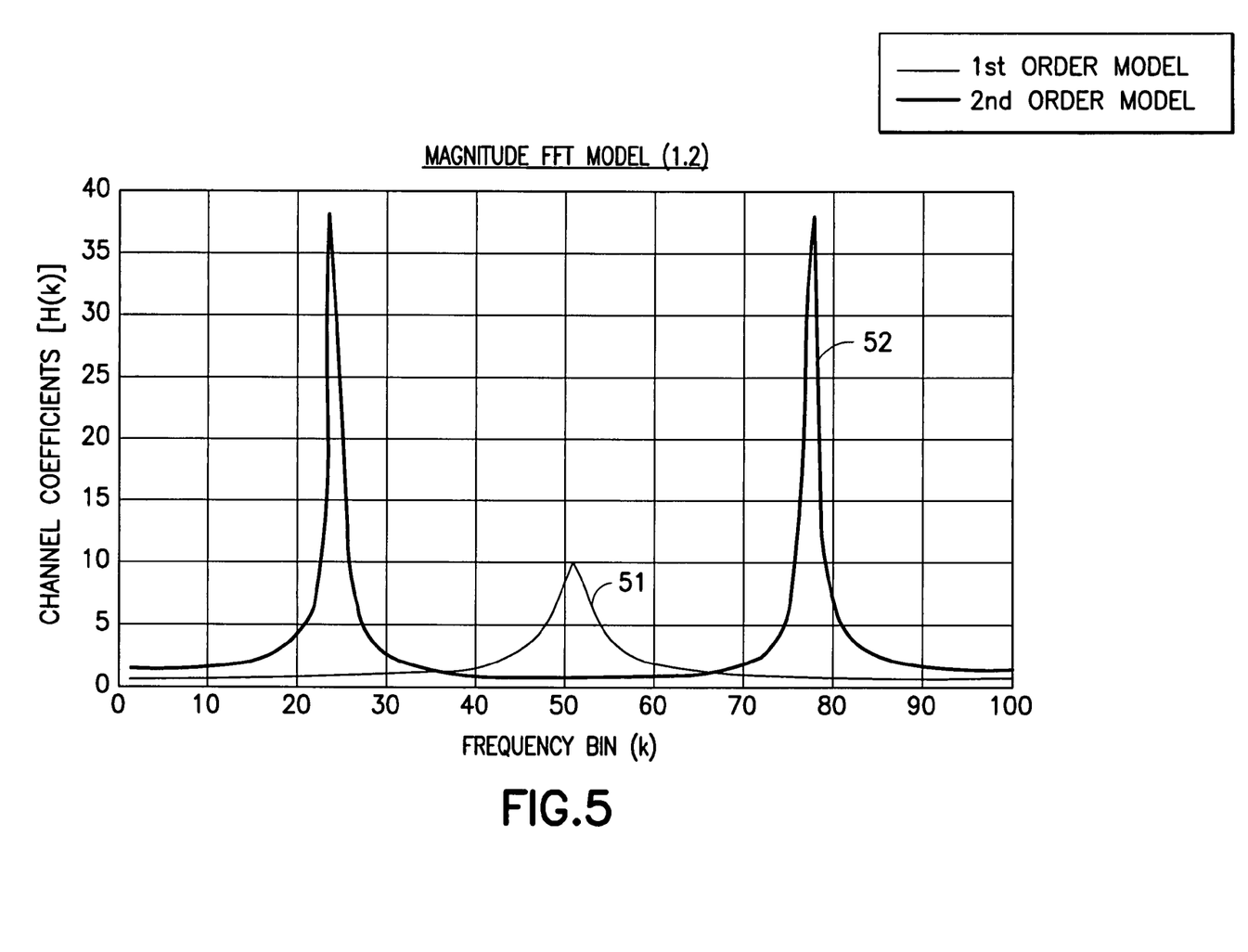
FIG. 5 shows Spectral plots for AR(1) and AR(2) Models

FIG. 5 shows the spectral domain response for both models, with curve 51 representing the first order model and curve 52 representing the second order model.

Figure 6A:
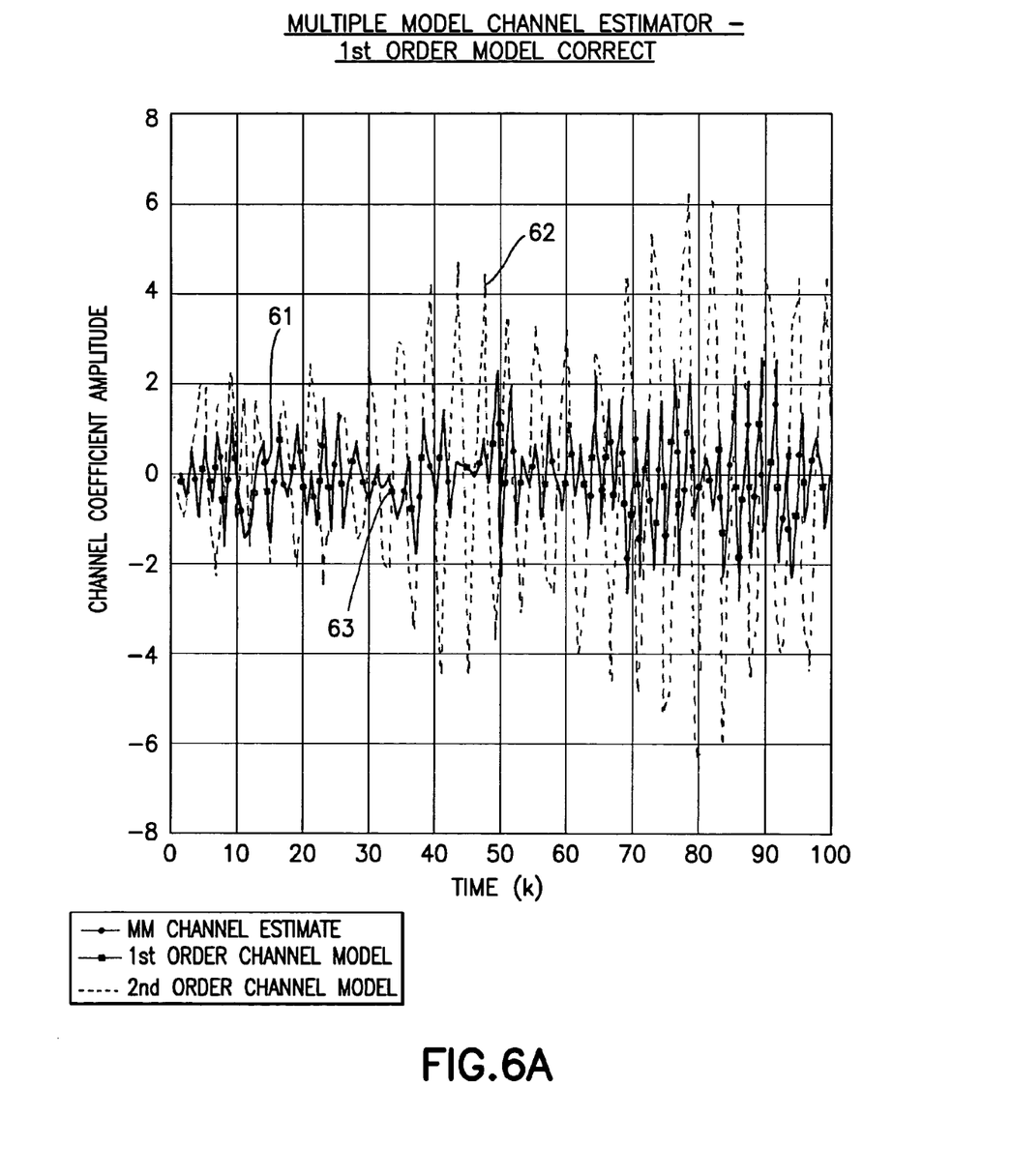
FIG. 6 shows channel estimates and model probabilities for the example of FIG. 5.
Figure 6B:
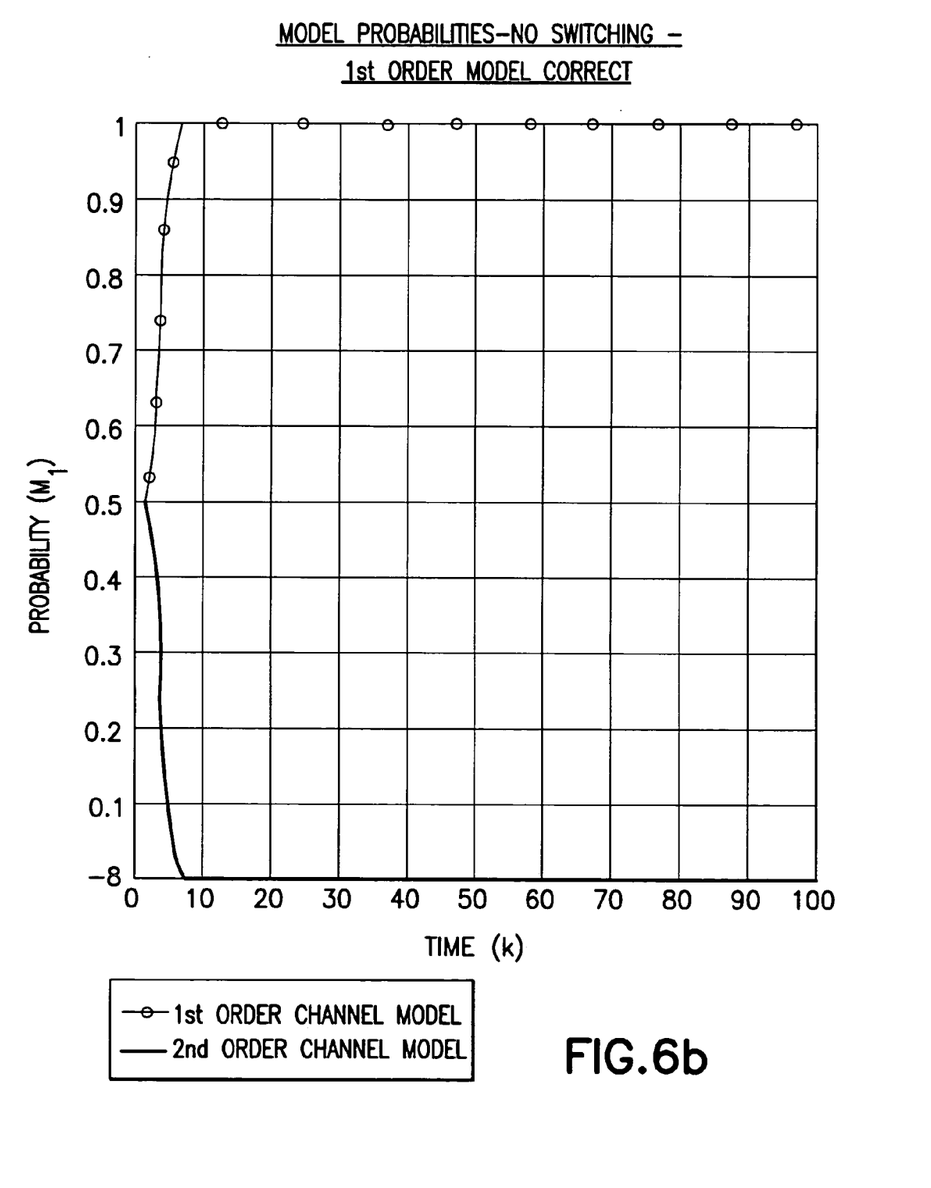

FIG. 6 shows the result of the choice process, FIG. 6A shows the channel estimates for each model separately and the estimator output for the weighted sum of the individual estimator outputs. Curve 61 is the estimate for the first order model; curve 62 is the corresponding estimate for the second order model and curve 63 is the weighted sum. It is evident that the weighted sum is closer to the first order model than to the second order model. FIG. 6B shows the probability of that model (first or second) being correct. In this example, the first order model was the correct one. The probability of the first order model being the correct one reached "1" within five samples, showing the rapid convergence possible with this process.

The method according to the invention may be summarized as:

Prepare models of a set of trajectories that are likely to be encountered;

Calculate initial parameters for each trajectory;

During the course of a transmission—

Select a set of model hypotheses

Load a set of initial parameters into a set of Kalman filters

Update the initial parameters with data from the current time epoch and from at least one previous time epoch (Eq 1 and 2 in FIG. 3);

Update the weights of the individual channels (Eq. 6, 7 in FIG. 3);

Sum over the set of model hypotheses, thereby integrating out the model parameters;

Output the parameters for the current time epoch;

Upon the satisfaction of a switching criterion, switch to an alternative set of model hypotheses.

Figure 7:
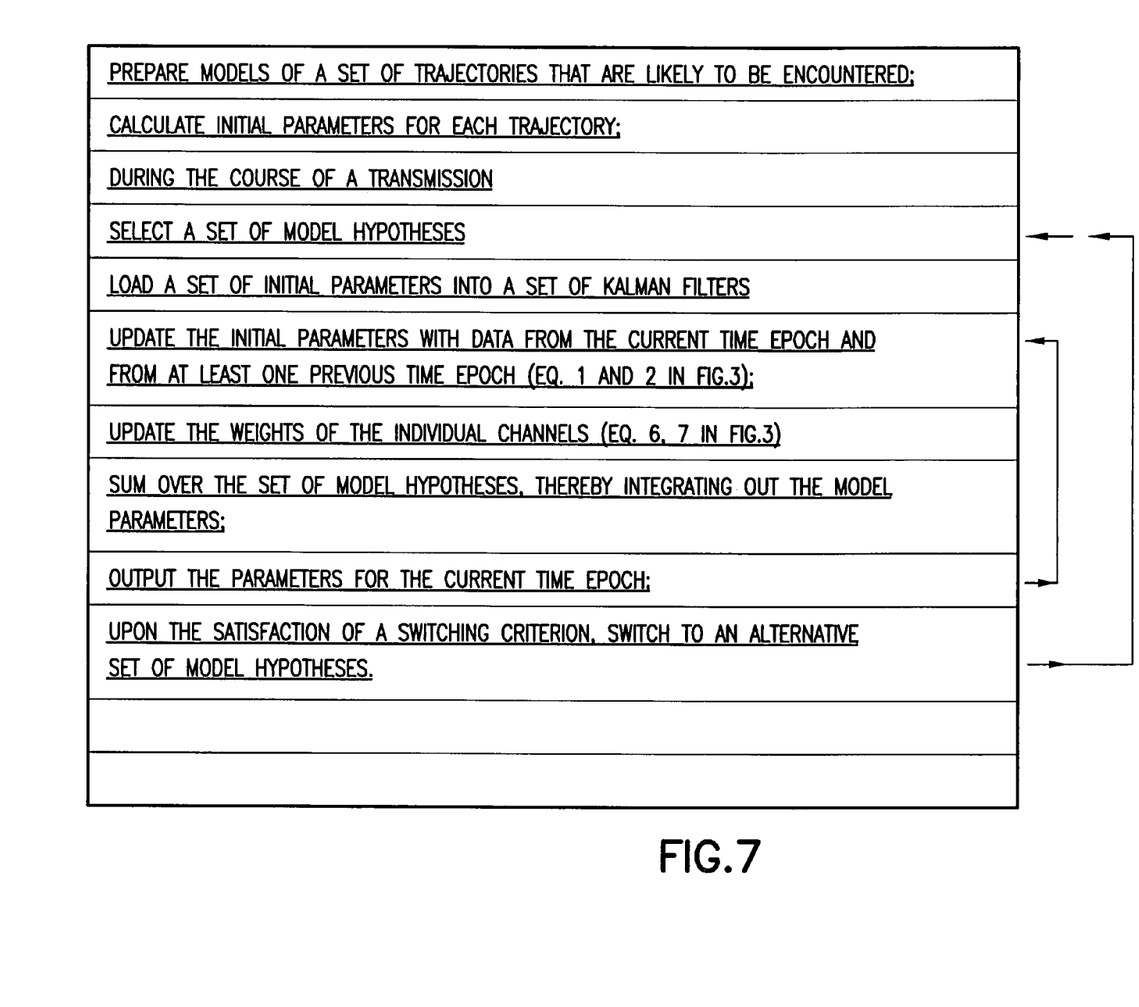
FIG. 7 shows a flow chart of a method of practicing the invention.

The foregoing is shown in Flow chart form in FIG. 7.

The output parameters are used in processing the input RF data, e.g. in an OFDM-MIMO system.

Those skilled in the art will be well aware that both the base station and the mobile stations in a wireless system will have the Kalman filters and other hardware illustrated here. The processing including arithmetic operations may be carried out in a general purpose computer and/or a digital signal processor, both suitable programmed. The term "processing unit" and similar terms will refer to both interchangeably. In addition, the method illustrated here may be carried out in a combination of hardware and software, with appropriate software substituting for dedicated hardware as the system designer chooses.

Although the invention has been described with respect to a limited number of embodiments, those skilled in the art will appreciate that other embodiments may be constructed within the spirit and scope of the following claims.

I claim:

1. A method of receiving wireless transmission data through a channel from a transmitter to a receiver, comprising the steps of:

providing a set of channel model hypotheses;

forming a set of Kalman filters in said receiver corresponding to each of said set of channel model hypotheses;

generating from said set of Kalman filters a set of estimated channel parameters;

calculating a set of probabilities corresponding to each of said set of estimated channel parameters;

multiplying each of said set of estimated channel parameters by a corresponding probability to form a set of channel estimation terms;

summing said set of channel estimation terms to form a composite channel estimation parameter; and processing observed wireless data with said composite channel estimation parameter.

2. A method according to claim 1, in which said step of calculating said set of probabilities is performed recursively in which an estimate for the probability of a kth step is calculated from an estimated probability for a (k−1)th step.

3. An article of manufacture comprising a program storage medium readable by a computer, the medium embodying instructions executable by the computer for performing the method steps of claim 2.

4. A method according to claim 2, in which said Kalman filter receives as input observed data from a kth time epoch and an estimated channel parameter from at least one previous time epoch before said kth time epoch.

5. An article of manufacture comprising a program storage medium readable by a computer, the medium embodying instructions executable by the computer for performing the method steps of claim 4.

6. A method according to claim 1, in which said step of generating further comprises a step of removing a dependence of said set of estimated channel parameters on said set of channel model hypotheses.

7. An article of manufacture comprising a program storage medium readable by a computer, the medium embodying instructions executable by the computer for performing the method steps of claim 6.

8. A method according to claim 6, in which at least one Kalman filter of said set of Kalman filters receives as input observed data from a kth time epoch and an estimated channel parameter from at least one previous time epoch before said kth time epoch.

9. An article of manufacture comprising a program storage medium readable by a computer, the medium embodying instructions executable by the computer for performing the method steps of claim 8.

10. A method according to claim 2, in which said step of generating a set of estimated channel parameters from said set of Kalman filters comprises a step of removing from said estimated channel parameters dependence on said channel hypotheses.

11. A method according to claim 10, in which said Kalman filter receives as input observed data from a kth time epoch and an estimated channel parameter from at least one previous time epoch before said kth time epoch.

12. A method according to claim 10, in which said Kalman filter receives as input an estimated channel parameter from two previous time epochs.

13. An article of manufacture comprising a program storage medium readable by a computer, the medium embodying instructions executable by the computer for performing the method steps of claim 10.

14. A method according to claim 1, in which said Kalman filter receives as input observed data from a kth time epoch and an estimated channel parameter dependent on at least one previous time epoch before said kth time epoch.

15. A method according to claim 14, in which said Kalman filter receives as input an estimated channel parameter dependent on at least two previous time epochs.

16. An article of manufacture comprising a program storage medium readable by a computer, the medium embodying instructions executable by the computer for performing the method steps of claim 15.

17. An article of manufacture comprising a program storage medium readable by a computer, the medium embodying instructions executable by the computer for performing the method steps of claim 14.

18. An article of manufacture comprising a program storage medium readable by a computer, the medium embodying instructions executable by the computer for performing the method steps of claim 1.

19. A receiver for receiving wireless transmission data through a channel from a transmitter, comprising:
  a set of Kalman filters in said receiver corresponding to each of a set of channel model hypotheses, each of said set of Kalman filters being adapted for generating a set of estimated channel parameters;
  a processing unit for calculating a set of probabilities corresponding to each of said set of estimated channel parameters;
  a set of multipliers for multiplying each of said set of estimated channel parameters by a corresponding probability to form a set of channel estimation terms;
  a summing unit for summing said set of channel estimation terms to form a composite channel estimation parameter; and
  a processing unit for processing observed wireless data with said composite channel estimation parameter.

20. A receiver according to claim 19, in which said processing unit for calculating a set of probabilities includes means for calculating said probabilities recursively in which an estimate for the probability of a kth step is calculated from an estimated probability for a (k−1)th step.

21. A receiver according to claim 20, in which said step of generating from said set of Kalman filters a set of estimated channel parameters is performed in said processing unit adapted for removing dependence of said estimated channel parameters on said channel hypotheses.

22. A receiver according to claim 21, in which said Kalman filter receives as input observed data from a kth time epoch and an estimated channel parameter from at least one previous time epoch.

23. A receiver according to claim 20, in which said Kalman filter receives as input observed data from a kth time epoch and an estimated channel parameter from at least one previous time epoch.

24. A receiver according to claim 23, in which said Kalman filter receives as input an estimated channel parameter from two previous time epochs.

25. A receiver according to claim 19, in which said set of estimated channel parameters is configured to be generated in said processing unit adapted for removing a dependence of said set of estimated channel parameters on said set of channel model hypotheses.

26. A receiver according to claim 25, in which at least one Kalman filter of said set of Kalman filters receives as input observed data from a kth time epoch and an estimated channel parameter from at least one previous time epoch.

27. A receiver according to claim 19, in which said Kalman filter receives as input observed data from a kth time epoch and an estimated channel parameter from at least one previous time epoch.

28. A receiver according to claim 27, in which said Kalman filter receives as input an estimated channel parameter from two previous time epochs.

29. A receiver comprising:
  a set of filtering means corresponding to each of a set of channel model hypotheses, each of said set of filtering means being adapted for generating a set of estimated channel parameters;
  calculating means for calculating a set of probabilities corresponding to each of said set of estimated channel parameters;
  multiplying means for multiplying each of said set of estimated channel parameters by a corresponding probability to form a set of channel estimation terms;
  summing means for summing said set of channel estimation terms to form a composite channel estimation parameter; and
  processing means for processing observed wireless data with said composite channel estimation parameter.

30. The receiver of claim 29, wherein:
  the set of filtering means comprises a set of Kalman filtering means; and
  at least one of the calculating means, multiplying means, summing means, and processing means comprises a digital signal processing means.

* * * * *